United States Patent
Headrick

(10) Patent No.: US 10,436,464 B1
(45) Date of Patent: Oct. 8, 2019

(54) FORCED AIR DEVICE FOR USE WITH AN OUTDOOR TABLE

(71) Applicant: Wade Headrick, South Jordan, UT (US)

(72) Inventor: Wade Headrick, South Jordan, UT (US)

( * ) Notice: Subject to any disclaimer, the term of this patent is extended or adjusted under 35 U.S.C. 154(b) by 68 days.

(21) Appl. No.: 15/877,526

(22) Filed: Jan. 23, 2018

(51) Int. Cl.
F24F 5/00 (2006.01)
F25D 3/12 (2006.01)
F25D 17/06 (2006.01)
A01M 29/14 (2011.01)

(52) U.S. Cl.
CPC ............ F24F 5/0017 (2013.01); A01M 29/14 (2013.01); F25D 3/125 (2013.01); F25D 17/06 (2013.01); F25D 2303/0841 (2013.01); F25D 2317/0661 (2013.01); F25D 2400/12 (2013.01)

(58) Field of Classification Search
CPC ....... F24F 5/0017; A01M 29/14; F25D 17/06; F25D 3/125; F25D 2317/0661; F25D 2400/12; F25D 2303/0841
USPC .......................................................... 62/425
See application file for complete search history.

(56) References Cited

U.S. PATENT DOCUMENTS

| | | | |
|---|---|---|---|
| 3,228,317 A | 1/1966 | Westman | |
| 3,233,618 A | 2/1966 | Ferrier | |
| 3,258,200 A | 6/1966 | White | |
| D260,163 S | 8/1981 | Stewart, Jr. | |
| D279,833 S | 7/1985 | Eberle | |
| 5,832,943 A | 11/1998 | Johnson | |
| 5,953,933 A * | 9/1999 | Cheng | F24F 5/0017 62/420 |
| 6,499,411 B2 | 12/2002 | Brown | |
| 6,571,574 B1 * | 6/2003 | Blackstone | F24F 5/0017 62/420 |
| 8,267,269 B2 | 9/2012 | Gundersen | |
| 8,899,253 B1 | 12/2014 | Watson | |
| 2006/0254305 A1 * | 11/2006 | Urfig | F24F 5/0017 62/425 |
| 2013/0216213 A1 * | 8/2013 | Thomas | F24F 7/007 392/465 |

FOREIGN PATENT DOCUMENTS

EP          1842452 A      10/2007

* cited by examiner

Primary Examiner — Ana M Vazquez

(57) ABSTRACT

The forced air device for use with an outdoor table is a device that is used to keep flies and insects away from an outdoor table, and also to act as a cooling device. The disclosed device generates a flow of cooled air using dry ice. The forced air device for use with an outdoor table includes a fan module, a $CO_2$ module, a vent module, a control system, a first plurality of locking tabs, and a second plurality of locking tabs. The first plurality of locking tabs attaches the fan module to the $CO_2$ module. The second plurality of locking tabs attaches the $CO_2$ module to the vent module. The control system creates a cooled airflow through the disclosed device from the fan module to the vent module.

13 Claims, 8 Drawing Sheets

FORCED AIR DEVICE FOR USE WITH AN OUTDOOR TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of heating and heat exchange, more specifically, a heat exchange apparatus in which the heat exchange media come into direct contact without chemical interaction.

SUMMARY OF INVENTION

The forced air device for use with an outdoor table is a device that is used to keep flies and insects away from an outdoor table, and also to act as a cooling device. The forced air device for use with an outdoor table is configured for outdoor use. The forced air device for use with an outdoor table is configured for use with a table. The forced air device for use with an outdoor table is configured for use with foodstuff stored on the table. The forced air device for use with an outdoor table cool the foodstuff. The forced air device for use with an outdoor table generates a flow of cooled air using dry ice. The cooled airflow is directed onto the foodstuff to keep the foodstuff cool. The forced air device for use with an outdoor table comprises a fan module, a $CO_2$ module, a vent module, a control system, a first plurality of locking tabs, and a second plurality of locking tabs. The first plurality of locking tabs attaches the fan module to the $CO_2$ module. The second plurality of locking tabs attaches the $CO_2$ module to the vent module. The control system creates an airflow through the forced air device for use with an outdoor table from the fan module to the vent module. The generated airflow flows around the dry ice, which cools the mass of the airflow as it the airflow passes through the forced air device for use with an outdoor table.

These together with additional objects, features and advantages of the forced air device for use with an outdoor table will be readily apparent to those of ordinary skill in the art upon reading the following detailed description of the presently preferred, but nonetheless illustrative, embodiments when taken in conjunction with the accompanying drawings.

In this respect, before explaining the current embodiments of the forced air device for use with an outdoor table in detail, it is to be understood that the forced air device for use with an outdoor table is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the forced air device for use with an outdoor table.

It is therefore important that the claims be regarded as including such equivalent construction insofar as they do not depart from the spirit and scope of the forced air device for use with an outdoor table. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
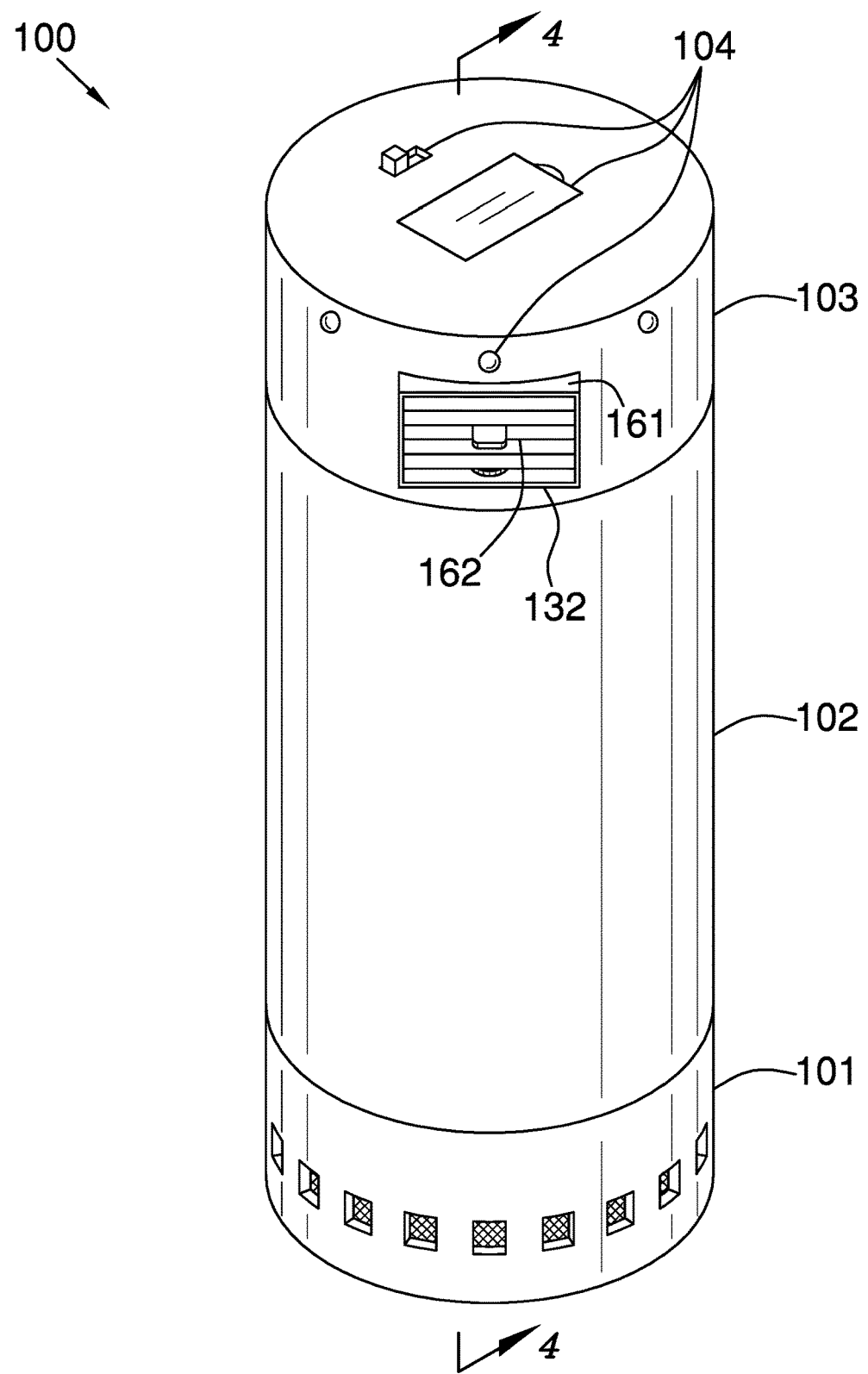
FIG. 1 is a perspective view of an embodiment of the disclosure.
Figure 2:
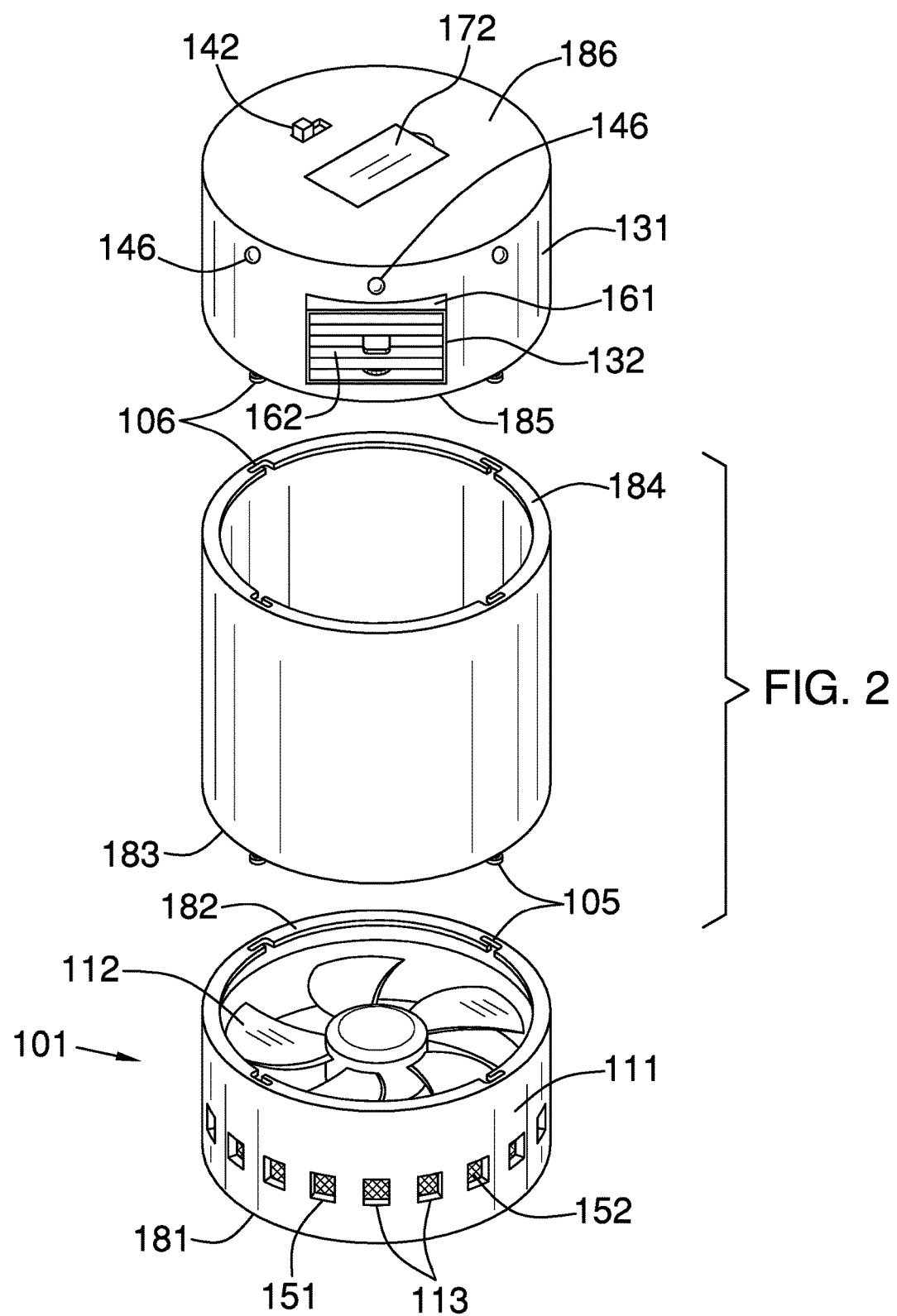
FIG. 2 is an exploded view of an embodiment of the disclosure.
Figure 3:
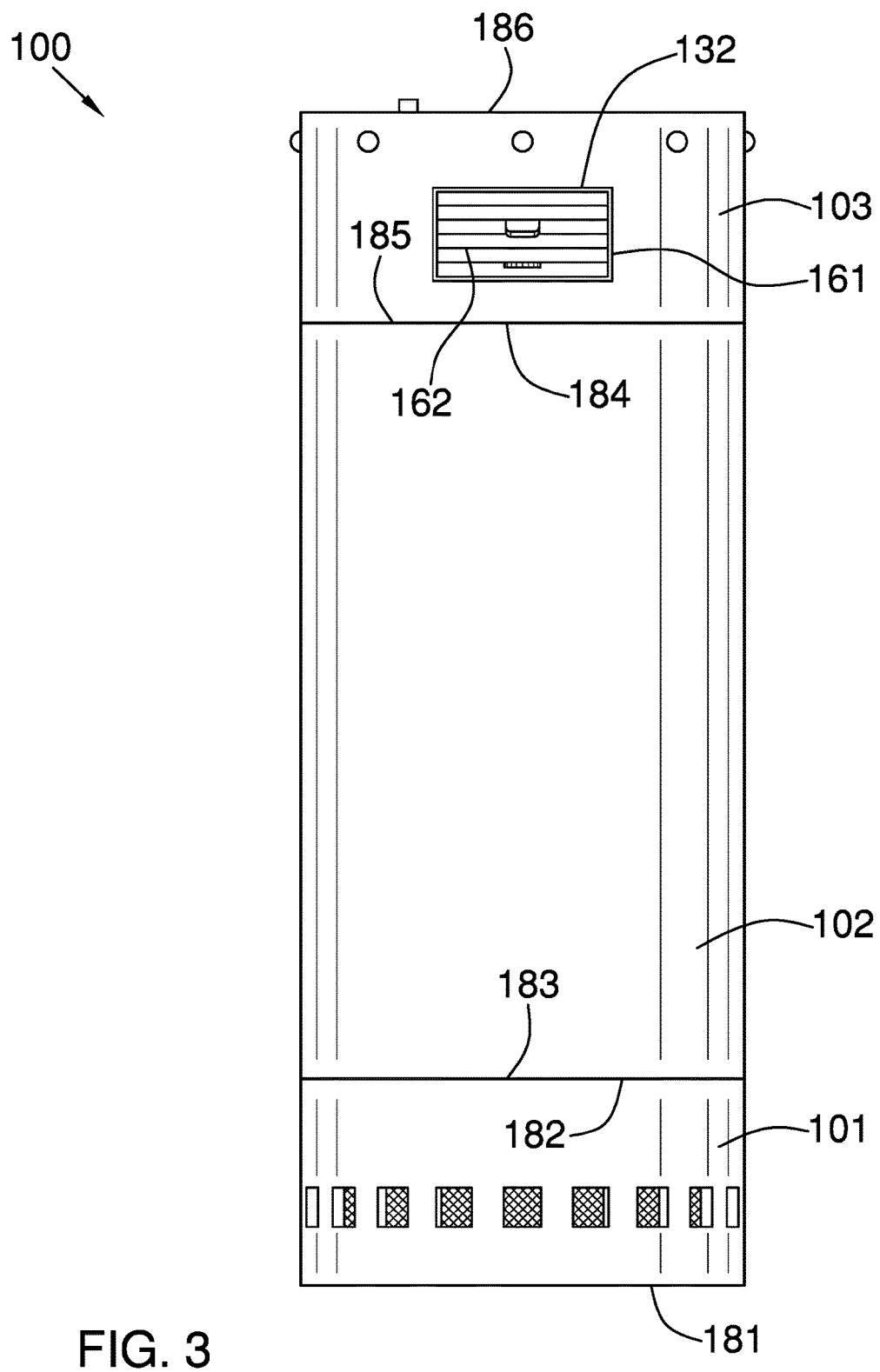
FIG. 3 is a side view of an embodiment of the disclosure.
Figure 4:
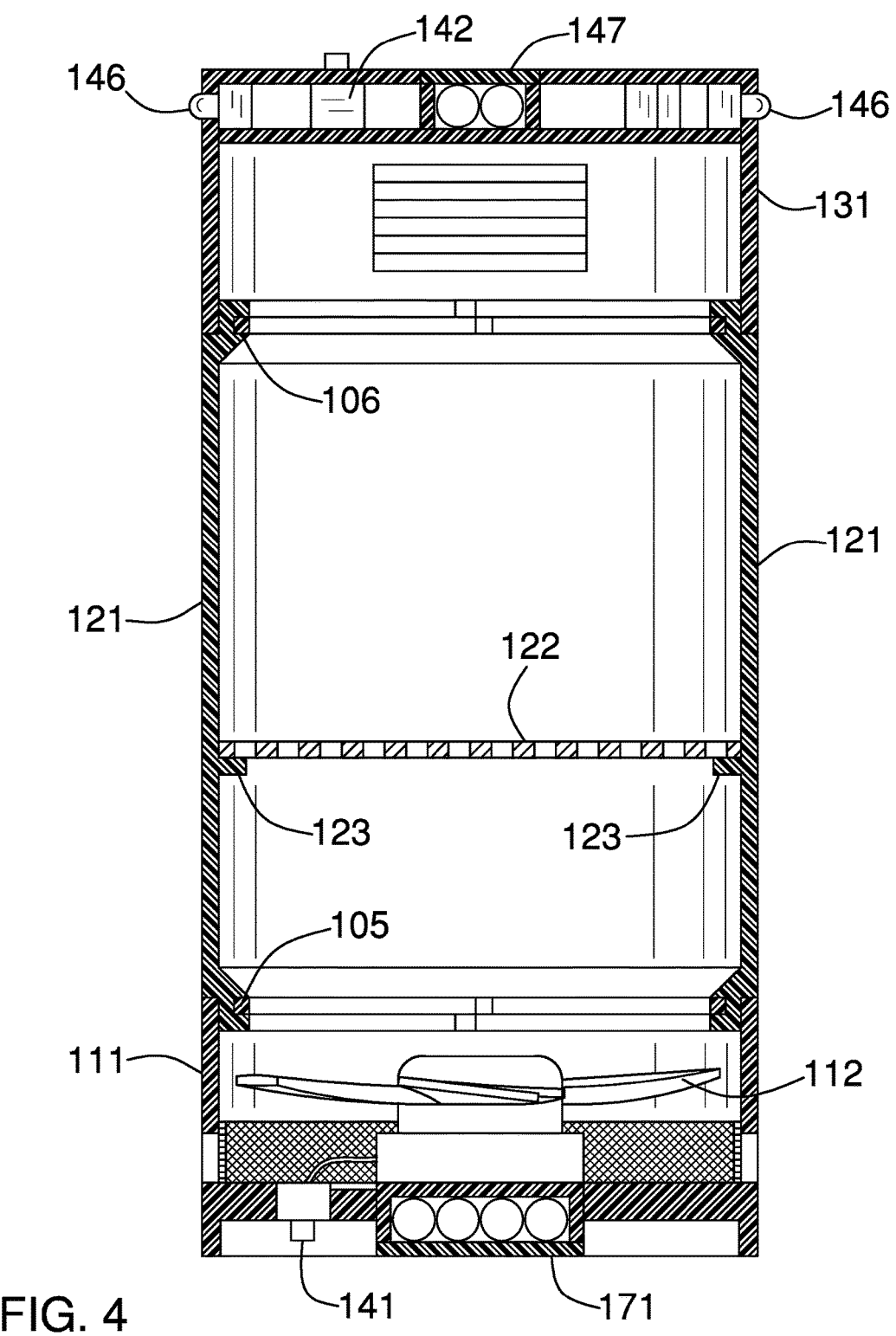
FIG. 4 is a cross-sectional view of an embodiment of the disclosure across 4-4 as shown in FIG. 1.
Figure 5:
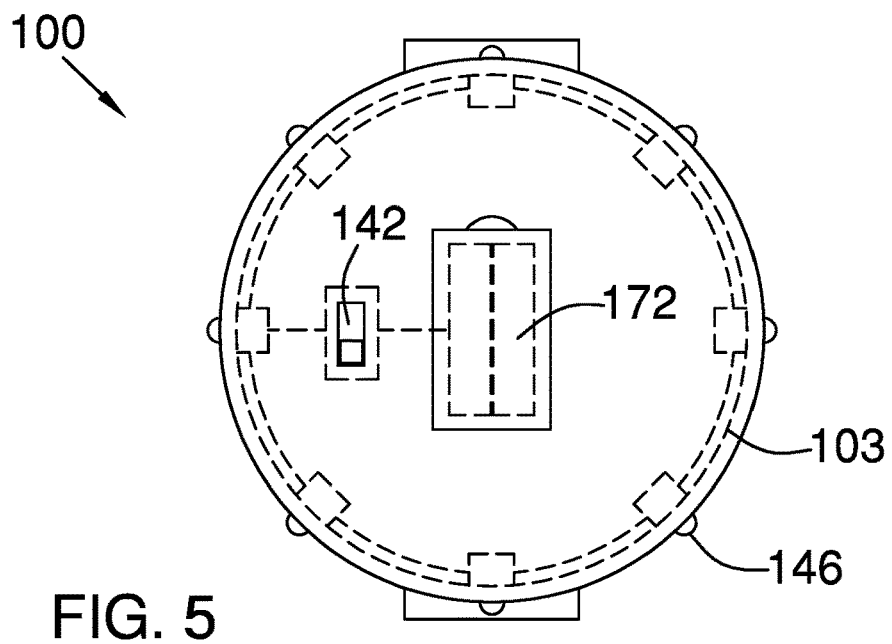
FIG. 5 is a top view of an embodiment of the disclosure.
Figure 6:
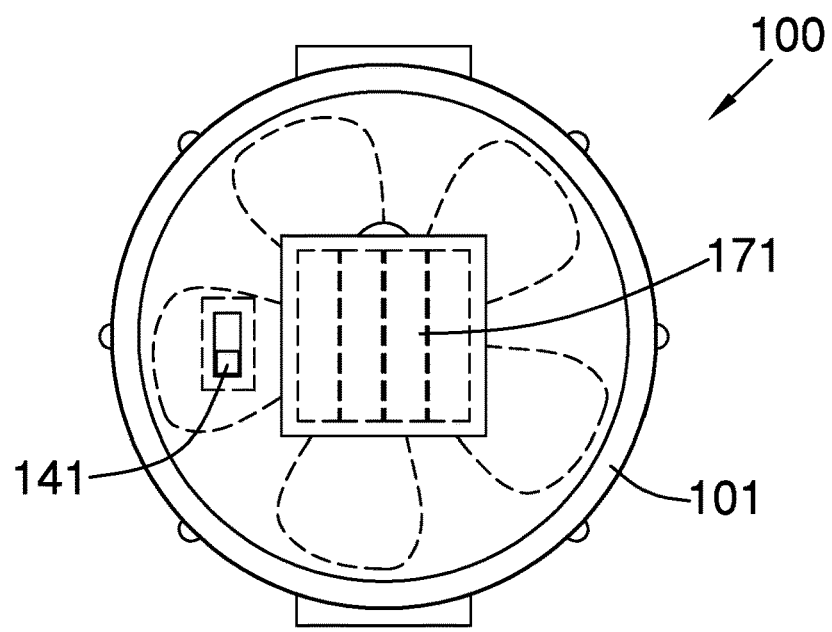
FIG. 6 is a bottom view of an embodiment of the disclosure.
Figure 7:
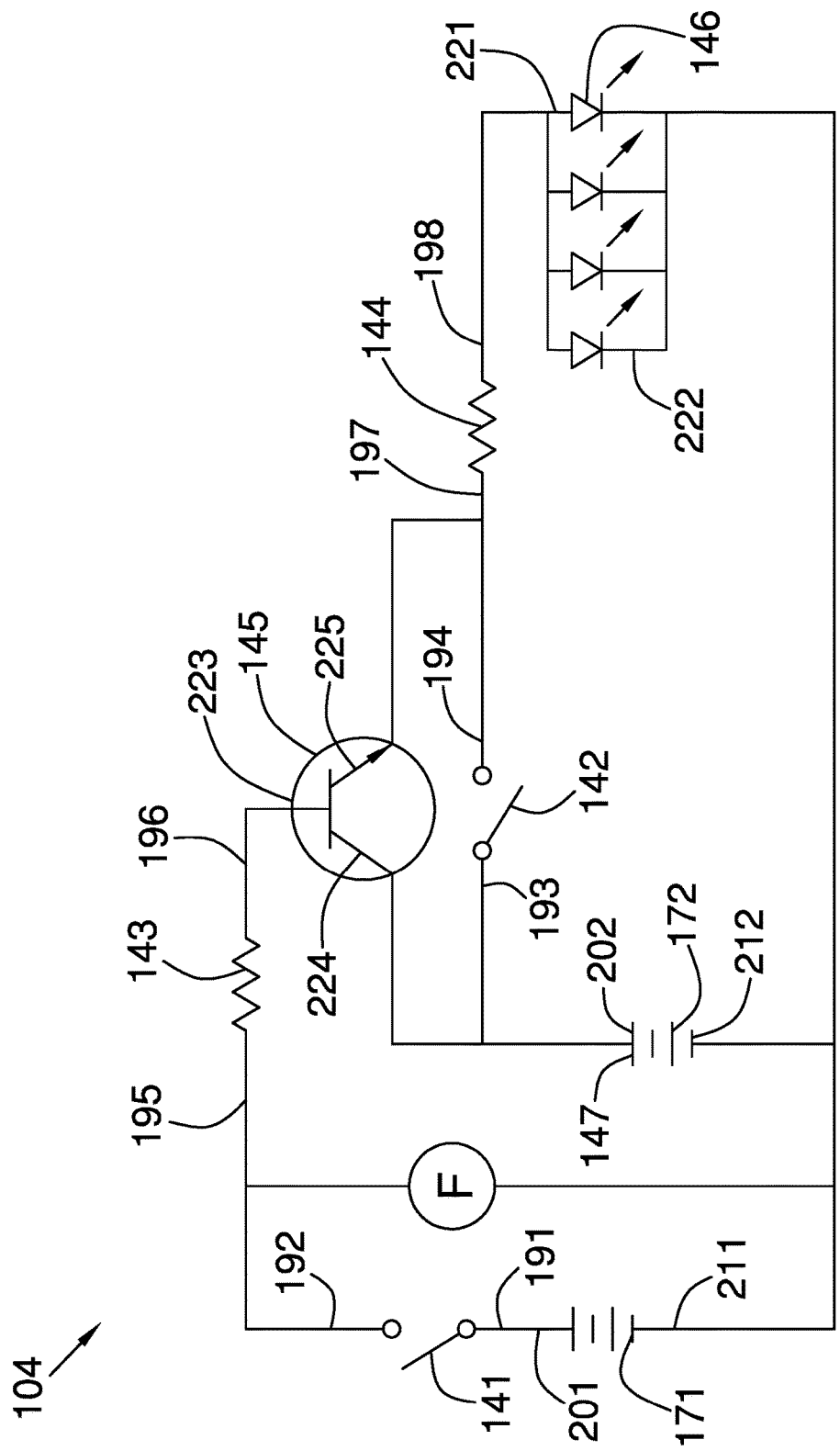
FIG. 7 is a schematic view of an embodiment of the disclosure.
Figure 8:
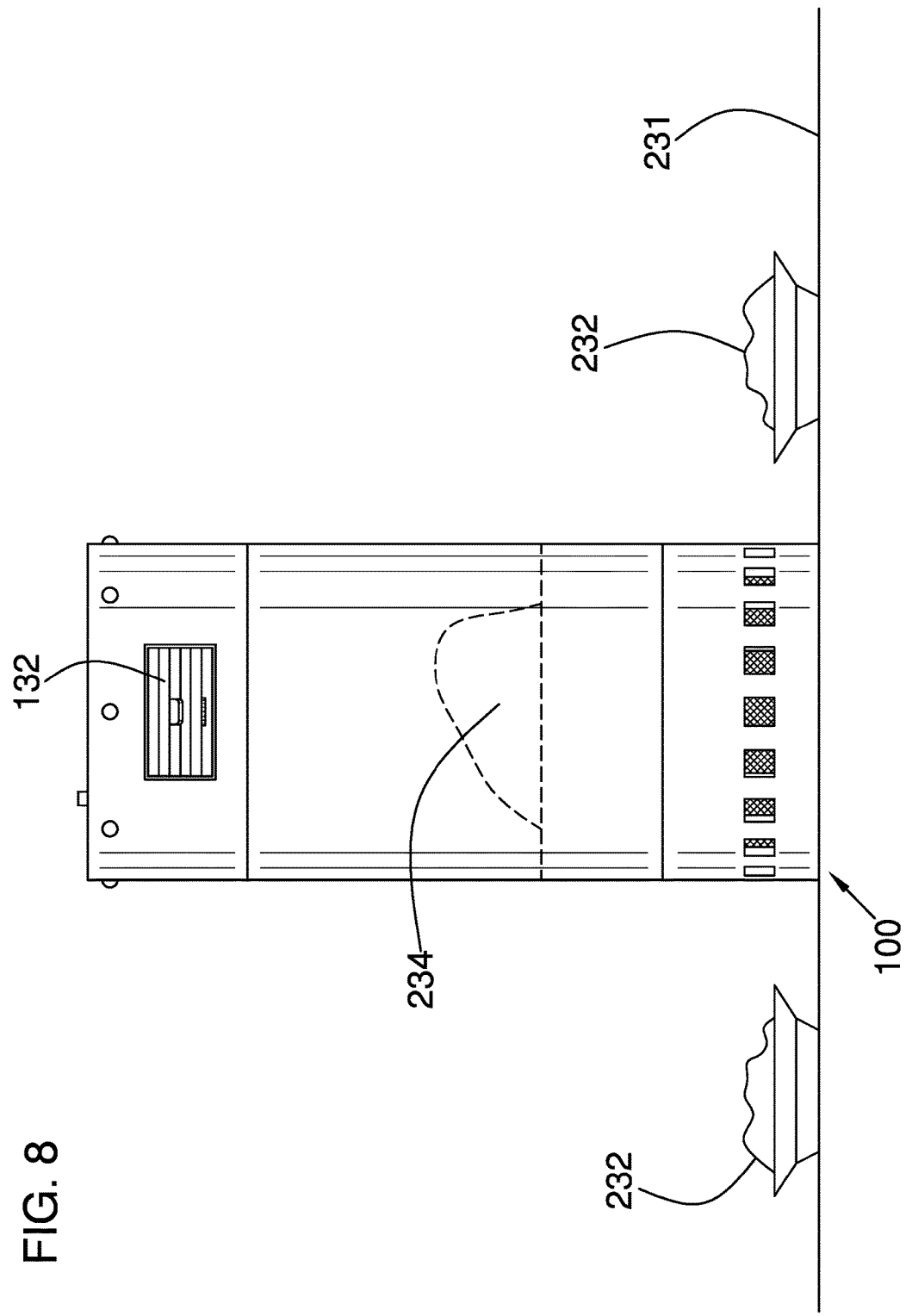
FIG. 8 is an in-use view of an embodiment of the disclosure.
Figure 9:
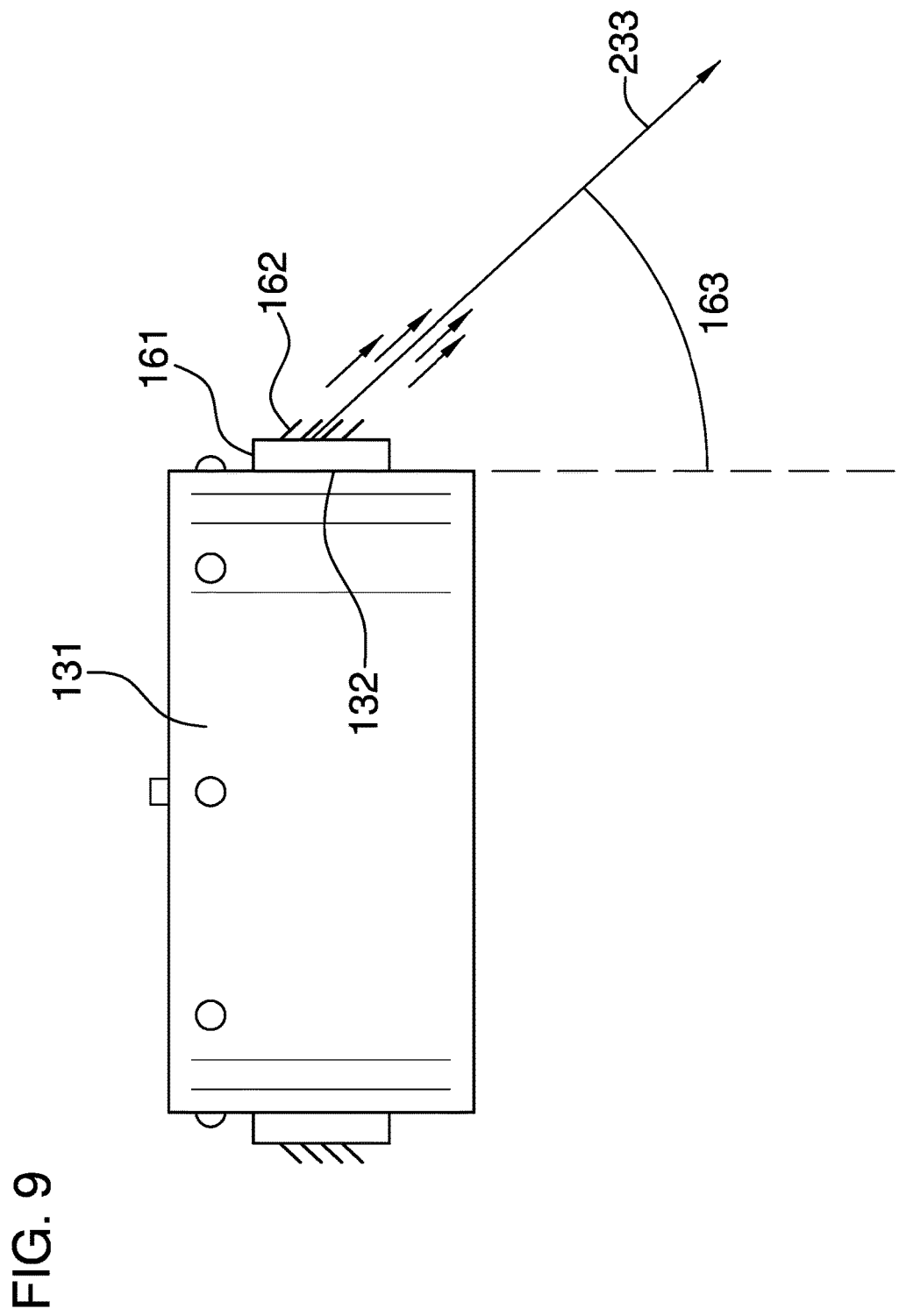
FIG. 9 is a detail view of an embodiment of the disclosure.

Detailed reference will now be made to one or more potential embodiments of the disclosure, which are illustrated in FIGS. 1 through 9.

The forced air device for use with an outdoor table 100 (hereinafter invention) is a device that is used to keep flies and insects away from an outdoor table, and also to act as a cooling device. The invention 100 is configured for outdoor use. The invention 100 is configured for use with a table 231. The invention 100 is configured for use with foodstuff 232 stored on a table 231. The invention 100 cools the foodstuff 232 and keeps flies and insects away from the foodstuff 232.

The invention 100 generates a flow of cooled air using dry ice 234. The cooled airflow 233 is directed onto the foodstuff 232 to keep the foodstuff 232 cool. The invention 100 comprises a fan module 101, a CO2 module 102, a vent module 103, a control system 104, a first plurality of locking tabs 105, and a second plurality of locking tabs 106. The first plurality of locking tabs 105 attaches the fan module 101 to the CO2 module 102. The second plurality of locking tabs 106 attaches the CO2 module 102 to the vent module 103. The control system 104 creates an airflow 233 through the invention 100 from the fan module 101 to the vent module 103. The generated airflow 233 flows around the dry ice 234, which cools the mass of the airflow 233 as it the airflow 233 passes through the invention 100.

Within this disclosure, the table 231 refers to a supporting surface upon which both the invention 100 and the foodstuff 232 sit. The foodstuff 232 refers to edible materials that are destined for consumption. The airflow 233 refers to the mass of air that is pumped by the fan 112 through the invention 100 for cooling. Dry ice 234 is a common name for carbon dioxide in a solid phase. The dry ice 234 cools the airflow 233 as it passes over the dry ice 234. Dry ice 234 is a readily and commercially available product.

The fan module 101 is the inferior module of the invention 100. The fan module 101 draws: 1) air into the invention 100; and, 2) creates the airflow 233 through the invention 100. The fan module 101 comprises a fan cylinder 111, a fan 112, and a plurality of intake vents 113. The fan cylinder 111 is further defined with a first end 181 and a second end 182.

The fan cylinder 111 is a hollow prism-shaped structure that forms the exterior surfaces of the fan module 101. The fan 112 is an electrically powered device that creates the airflow 233 through the invention 100. The use of fans is well-known and documented in the mechanical arts.

Each of the plurality of intake vents 113 is an aperture formed through the lateral face of the fan cylinder 111. Each of the plurality of intake vents 113 comprises a vent aperture 151 and a vent screen 152. Each of the plurality of intake vents 113 are identical. The airflow 233 is drawn into the fan cylinder 111 by the fan 112 through the plurality of intake vents 113. The vent aperture 151 is a hole that is formed through the lateral face of the fan cylinder 111 such that air can flow through the vent aperture 151 into the fan 112. The vent screen 152 is a mesh that is placed over the vent aperture 151 to prevent the intake of objects into the fan 112.

The CO2 module 102 is the intermediate module between the fan module 101 and the vent module 103. The CO2 module 102 contains the dry ice 234 during normal use of the invention 100. The airflow 233 through the CO2 module 102 is cooled by the dry ice 234 during normal use of the invention 100. The CO2 module 102 comprises a CO2 cylinder 121, a CO2 grate 122, and a grate ledge 123. The CO2 cylinder 121 is further defined with a third end 183 and a fourth end 184.

The CO2 cylinder 121 is a hollow prism-shaped structure that forms the exterior surfaces of the CO2 module 102. The CO2 grate 122 is a screen that is installed in the CO2 cylinder 121. The CO2 grate 122 supports the dry ice 234 within the CO2 module 102 during normal use of the invention 100. The CO2 grate 122 rests upon the grate ledge 123. The grate ledge 123 is a rim formed on the interior surface of the CO2 cylinder 121.

The vent module 103 is the superior module of the invention 100. The vent module 103 receives the cooled airflow 233 from the CO2 module 102 and discharges the cooled airflow 233 onto any foodstuff 232 placed on the table 231. The vent module 103 comprises a vent cylinder 131 and a plurality of takeoffs 132. The vent cylinder 131 is further defined with a fifth end 185 and a sixth end 186. Each of the plurality of takeoffs 132 is further defined with a discharge angle 163. The discharge angle 163 of each of the plurality of takeoffs 132 is adjustable.

The vent cylinder 131 is a hollow prism-shaped structure that forms the exterior surfaces of the vent module 103.

Each of the plurality of takeoffs 132 is a vent that discharges the airflow 233 from the invention 100. Each of the plurality of takeoffs 132 is formed such that the airflow 233 discharges onto any foodstuff 232 placed on the table 231. Each of the plurality of takeoffs 132 comprises a discharge plate 161 and a louver 162. Each of the plurality of takeoffs 132 are identical. Each of the plurality of takeoffs 132 attaches to the exterior surface of the vent cylinder 131. The discharge plate 161 is a rectilinear aperture formed through the lateral face of the vent cylinder 131. The louver 162 is a structure with negative spaces that is formed within the discharge plate 161. The louver 162 redirects the airflow 233 through the discharge plate 161. The discharge plate 161 is formed through the discharge plate 161 such that the discharge angle 163 is an acute angle formed between the louver 162 and the lateral face of the vent cylinder 131. The discharge angle 163 is selected such that the discharged airflow 233 falls upon the foodstuff 232.

The control system 104 is an electrical circuit. The control system 104 controls the airflow 233 through the invention 100. The control system 104 further illuminates the table 231 when the invention 100 is in use. The control system 104 comprises a first switch 141, a second switch 142, a first limit resistor 143, a second limit resistor 144, a transistor 145, a plurality of LEDs 146, and one or more power sources 147.

The first switch 141 is further defined with a first lead 191 and a second lead 192. The second switch 142 is further defined with a third lead 193 and a fourth lead 194. The first limit resistor 143 is further defined with a fifth lead 195 and a sixth lead 196. The second limit resistor 144 is further defined with a seventh lead 197 and an eighth lead 198. The transistor 145 is further defined with a base 223, a collector 224, and an emitter 225. Each of the plurality of LEDs 146 is further defined with an anode 221 and a cathode 222.

The first switch 141 is a commercially available maintained switch that is accessible from the exterior of the invention 100. The first switch 141 controls the flow of electric current into the fan 112 and the plurality of LEDs 146.

The second switch 142 is a commercially available maintained switch that is accessible from the exterior of the vent cylinder 131. The second switch 142 controls the flow of electric current into the plurality of LEDs 146. The second switch 142 allows the use of the plurality of LEDs 146 to illuminate the table 231 when the use of the fan 112 is not necessary.

The first limit resistor 143 is a commercially available resistor that limits current flow into the transistor 145. The second limit resistor 144 is a commercially available resistor that limits current flow through the plurality of LEDs 146.

The transistor 145 is a commercially available three-terminal semiconducting device. The transistor 145 operates as a switch. When a voltage is applied to the base 223, current will flow into the base 223 and the transistor 145 will act as a closed switch allowing current to flow from the collector 224 to the emitter 225. When the voltage is removed from the base 223, the transistor 145 will act as an open switch disrupting current flow from the collector 224 to the emitter 225.

Each of the plurality of LEDs 146 is a two-terminal semiconducting device. Each of the plurality of LEDs 146 are used to illuminate the table 231.

Each of the one or more power sources 147 is a commercially available device that provides a source of electrical energy. The one or more power sources 147 are used to power the fan 112 and the plurality of LEDs 146. In the first potential embodiment of the disclosure, the one or more power sources 147 comprises a first power source 171 and a second power source 172. The first power source 171 is further defined with a first positive terminal 201 and a first negative terminal 211. The second power source 172 is further defined with a second positive terminal 202 and a second negative terminal 212.

In the first potential embodiment of the disclosure, the first power source 171 is the power source selected from the one or more power sources 147 that simultaneously powers the fan 112 and the plurality of LEDs 146 through the first switch 141. The second power source 172 is the power source selected from the one or more power sources 147 that solely powers the plurality of LEDs 146 through the second switch 142. The first switch 141 draws electrical power from the first power source 171. The second switch 142 draws electrical power from the second power source 172. The plurality of LEDs 146 are wired in a parallel circuit. The use of an LED in the design of an electrical circuit is well-known and documented in the electrical arts.

The first plurality of locking tabs 105 is a collection of locking tabs that are used to attach the fan module 101 to the CO2 module 102. The second plurality of locking tabs 106 is a collection of locking tabs that are used to attach the CO2 module 102 to the vent module 103. The use of locking tabs to attach objects is well-known and documented in the mechanical arts. Locking tabs are discussed in greater detail elsewhere in this disclosure.

The following seven paragraphs describe the assembly of the invention 100.

The first plurality of locking tabs 105 attaches the second end 182 of the fan cylinder 111 to the third end 183 of the CO2 cylinder 121. The second plurality of locking tabs 106 attaches the fourth end 184 of the CO2 cylinder 121 to the fifth end 185 of the vent cylinder 131. The first end 181 of the fan cylinder 111 is a closed end. The sixth end 186 of the vent cylinder 131 is a closed end. The fan 112 is installed in the fan cylinder 111 such that the fan 112 draws air through the plurality of intake vents 113 and discharges that drawn air into the third end 183 of the vent cylinder 131.

The grate ledge 123 is formed on the interior lateral face of the CO2 cylinder 121. The plane formed by the grate ledge 123 is perpendicular to the center axis of the CO2 cylinder 121. The CO2 grate 122 rests on the superior edge of the grate ledge 123. The dry ice 234 rests on the superior surface of the CO2 grate 122 when the invention 100 is in use. The airflow 233 through the CO2 cylinder 121 is from the third end 183 to the fourth end 184. The airflow 233 through the vent cylinder 131 is from the fifth end 185 and is discharged out of each of the plurality of takeoffs 132.

The discharge plate 161 of each of the plurality of takeoffs 132 is formed through the lateral face of the vent cylinder 131 such that: 1) an acute angle is formed between the lateral face of the vent cylinder 131 and the redirected airflow 233 through the louver 162 in the direction of the fifth end 185; and, 2) the louver 162 extends into the interior space formed by the vent cylinder 131.

In the first potential embodiment of the disclosure, the vent cylinder 131 contains the second switch 142, the first limit resistor 143, the second limit resistor 144, the transistor 145, the plurality of LEDs 146, and the second power source 172. The fan cylinder 111 contains the first switch 141 and the first power source 171.

In the first potential embodiment of the disclosure, the first negative terminal 211 of the first power source 171 electrically connects to the second negative terminal 212 of the first power source 171. The cathode 222 of each of the plurality of LEDs 146 electrically connects to the second negative terminal 212 of the first power source 171. The fan 112 electrically connects to the second negative terminal 212 of the first power source 171.

The first positive terminal 201 of the first power source 171 electrically connects to the first lead 191 of the first switch 141. The second lead 192 of the first switch 141 electrically connects to the fan 112. The second lead 192 of the first switch 141 electrically connects to the fifth lead 195 of the first limit resistor 143. The sixth lead 196 of the first limit resistor 143 electrically connects to the base 223 of the transistor 145.

The second positive terminal 202 of the second power source 172 electrically connects to the third lead 193 of the second switch 142. The second positive terminal 202 of the second power source 172 electrically connects to the collector 224 of the transistor 145. The emitter 225 of the transistor 145 electrically connects to the seventh lead 197 of the second limit resistor 144. The fourth lead 194 of the second switch 142 electrically connects to the seventh lead 197 of the second limit resistor 144. The eighth lead 198 of the second limit resistor 144 electrically connects to the anode 221 of each of the plurality of LEDs 146.

The following definitions were used in this disclosure:

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Carbon Dioxide: As used in this disclosure, carbon dioxide (CAS 124-38-9) refers to a chemical compound with the formula CO2. In the solid phase, carbon dioxide is often referred to as dry ice.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Channel: As used in this disclosure, a channel is a passage through which an object or fluid passes.

Control System: As used in this disclosure, a control system is a first device or system that manages and regulates the behavior or operation of a second device or system.

Cylinder: As used in this disclosure, a cylinder is a geometric structure defined by two identical flat and parallel ends, also commonly referred to as bases, which are circular in shape and connected with a single curved surface, referred to in this disclosure as the face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diode: As used in this disclosure, a diode is a two terminal semiconductor device that allows current flow in only one direction. The two terminals are called the anode and the cathode. Electric current is allowed to pass from the anode to the cathode.

Fan: As used in this disclosure, a fan is a mechanical device with rotating blades that is used to create a flow or current of air.

Fluid: As used in this disclosure, a fluid refers to a state of matter wherein the matter is capable of flow and takes the shape of a container it is placed within. The term fluid commonly refers to a liquid or a gas.

Foodstuff: As used in this disclosure, a foodstuff refers to an edible material used as food or a beverage.

Grate: As used in this disclosure, a grate is a mesh structure that vertically supports a solid object while allowing fluids to flow around the solid object.

Grille: As used in this disclosure, a grille is a cover for a vent of an HVAC system. The grille comprises a barrier formed of bars or wires that allow for the passage of air through the grille while preventing solid items from passing through the grille.

Inferior: As used in this disclosure, the term inferior refers to a directional reference that is parallel to and in the same direction as the force of gravity.

Intermediate: As used in this disclosure, the term intermediate refers to a location that lies between a first object and a second object Lateral: As used in this disclosure, the term lateral refers to a direction that is parallel to a previously identified central axis.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Locking Tab: As used in this disclosure, a locking tab is a two element fastener wherein the first element of the fastener, which is mounted on a first object is a cantilever spring and the second element of the fastener is a hole which is formed in a second object. The free end of the cantilever has a hook formed in it such that when the free end of the cantilever is inserted into the hole, the hook latches against the edge of the hole preventing inadvertent removal of the cantilever. The first element is removed from the second element by moving the cantilever such that the hook clears the edge of the hole and then pulling the first element away from the second element.

Louver: As used in this disclosure, a louver is a (generally rectangular) plate-like structure that is installed in a vent for the purpose of directing air flow.

Maintained Switch: A used in this disclosure, a maintained switch is a switch that maintains the position that was set in the most recent switch actuation. A maintained switch works in an opposite manner to a momentary switch.

Negative Space: As used in this disclosure, negative space is a method of defining an object through the use of open or empty space as the definition of the object itself, or, through the use of open or empty space to describe the boundaries of an object.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal. When made of wood, a plate is often referred to as a board.

Power Source: As used in this disclosure, a power source is a source of the energy that enables the operation of the present disclosure. Examples of external power sources include, but are not limited to, electrical power sources and compressed air sources.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rim: As used in this disclosure, a rim is an outer edge or border that follows along the perimeter of an object.

Screen: As used in this disclosure, a screen is a meshed structure made of wire allows for the free flow of air but prevents larger objects from passing through the meshed structure.

Solid: As used in this disclosure, a solid refers to a state of matter that: 1) has a fixed volume; and, 2) does not flow.

Superior: As used in this disclosure, the term superior refers to a directional reference that is parallel to and in the opposite direction of the force of gravity.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Takeoff: As used in this disclosure, a takeoff is a ductwork fitting that is used to contain the air flowing through a port to conduct that air into a smaller duct or a vent.

Transistor: As used in this disclosure, a transistor is a general term for a three-terminal semiconducting electrical used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal.

Vent: As used in this disclosure, a vent is an opening in a structure that allows air to escape.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A heat exchange apparatus comprising:
   a fan module, a CO2 module, a vent module, a control module, a first plurality of locking tabs, and a second plurality of locking tabs;
   wherein the first plurality of locking tabs attaches the fan module to the CO2 module;
   wherein the second plurality of locking tabs attaches the CO2 module to the vent module;
   wherein the control module generates an airflow through the fan module, the CO2 module, and the vent module;
   wherein the heat exchange apparatus is configured for use with a table;
   wherein the heat exchange apparatus is configured for use with foodstuff stored on the table;
   wherein the heat exchange apparatus is adapted to prevent flies and insects from interacting with foodstuff, and also to cool the foodstuff;
   wherein the heat exchange apparatus cools the airflow using dry ice;
   wherein the fan module is an inferior module of the heat exchange apparatus;
   wherein the fan module draws air into the heat exchange apparatus;
   wherein the fan module creates the airflow through the heat exchange apparatus;
   wherein the CO2 module is an intermediate module of the heat exchange apparatus;
   wherein the CO2 module contains the dry ice;
   wherein the airflow through the CO2 module is cooled by the dry ice;
   wherein the vent module is a superior module of the heat exchange apparatus;
   wherein the vent module receives the cooled airflow from the CO2 module and discharges the cooled airflow onto the foodstuff;
   wherein the control module is an electrical circuit;
   wherein the control module controls the airflow through the heat exchange apparatus;
   wherein the control module further illuminates the table;
   wherein the fan module comprises a fan cylinder, a fan, and a plurality of intake vents;
   wherein the fan is installed in the fan cylinder;
   wherein the plurality of intake vents are formed in the fan cylinder;
   wherein the fan cylinder is further defined with a first end and a second end;
   wherein each of the plurality of intake vents comprises a vent aperture and a vent screen;
   wherein each of the plurality of intake vents are identical;
   wherein the vent screen is a mesh placed over the vent aperture;
   wherein the control module comprises a first switch, a second switch, a first limit resistor, a second limit resistor, a transistor, a plurality of LEDs, and one or more power sources;
   wherein the first switch, the second switch, the first limit resistor, the second limit resistor, the transistor, the plurality of LEDs, the one or more power sources are electrically interconnected;
   wherein the first switch is further defined with a first lead and a second lead;
   wherein the second switch is further defined with a third lead and a fourth lead;
   wherein the first limit resistor is further defined with a fifth lead and a sixth lead;
   wherein the second limit resistor is further defined with a seventh lead and an eighth lead;
   wherein the transistor is further defined with a base, a collector, and an emitter;
   wherein each of the plurality of LEDs is further defined with an anode and a cathode.

2. The heat exchange apparatus according to claim 1
   wherein the fan cylinder is a hollow prism-shaped structure
   wherein the fan cylinder forms an exterior surface of the fan module;
   wherein the fan is an electrically powered device;
   wherein the fan creates the airflow through the heat exchange apparatus;
   wherein each of the plurality of intake vents is an aperture formed through the lateral face of the fan cylinder.

3. The heat exchange apparatus according to claim 2
   wherein the CO2 module comprises a CO2 cylinder, a CO2 grate, and a grate ledge;
   wherein the CO2 grate is installed in the CO2 cylinder;
   wherein the grate ledge is formed in the CO2 cylinder;
   wherein the CO2 cylinder is further defined with a third end and a fourth end.

4. The heat exchange apparatus according to claim 3
   wherein the CO2 cylinder is a hollow prism-shaped structure;
   wherein the CO2 cylinder forms an exterior surface of the CO2 module;
   wherein the CO2 grate is a screen;

wherein the CO2 grate supports the dry ice within the CO2 module;
wherein the CO2 grate rests upon the grate ledge;
wherein the grate ledge is a rim formed on an interior surface of the CO2 cylinder.

5. The heat exchange apparatus according to claim 4
wherein the vent module comprises a vent cylinder and a plurality of takeoffs;
wherein the plurality of takeoffs attach to an exterior surface of the vent module;
wherein the vent cylinder is further defined with a fifth end and a sixth end;
wherein each of the plurality of takeoffs is further defined with a discharge angle;
wherein each of the plurality of takeoffs are identical;
wherein the discharge angle of each of the plurality of takeoffs is identical.

6. The heat exchange apparatus according to claim 5
wherein the vent cylinder is a hollow prism-shaped structure;
wherein the vent cylinder forms the exterior surface of the vent module;
wherein each of the plurality of takeoffs is a vent that discharges the airflow from the heat exchange apparatus;
wherein each of the plurality of takeoffs is formed such that the airflow discharges onto the foodstuff.

7. The heat exchange apparatus according to claim 6
wherein each of the plurality of takeoffs comprises a discharge plate and a louver;
wherein the discharge plate is a rectilinear aperture;
wherein the discharge plate is formed through a lateral face of the vent cylinder;
wherein the louver is a structure formed within the discharge plate;
wherein the louver redirects the airflow through the discharge plate.

8. The heat exchange apparatus according to claim 7
wherein the discharge plate is located such that the discharge angle is an acute angle formed between the louver and a redirected airflow of the vent cylinder;
wherein the discharge angle is selected such that the discharged airflow falls upon the foodstuff.

9. The heat exchange apparatus according to claim 8
wherein the first switch is a maintained switch
wherein the first switch is accessible from an exterior of the heat exchange apparatus;
wherein the second switch is a maintained switch;
wherein the second switch is accessible from the exterior of the vent cylinder;
wherein the first limit resistor limits current flow into the transistor;
wherein the second limit resistor limits current flow through the plurality of LEDs;
wherein the transistor is a three-terminal semiconducting device;
wherein each of the plurality of LEDs is a two-terminal semiconducting device;
wherein each of the plurality of LEDs illuminates the table;
wherein each of the one or more power sources is a device that provides a source of electrical energy;
wherein the one or more power sources are used to power the fan and the plurality of LEDs.

10. The heat exchange apparatus according to claim 9
wherein the one or more power sources comprises a first power source and a second power source;
wherein the first power source is further defined with a first positive terminal and a first negative terminal;
wherein the second power source is further defined with a second positive terminal and a second negative terminal;
wherein the first power source is the power source selected from the one or more power sources that simultaneously powers the fan and the plurality of LEDs through the first switch;
wherein the second power source is the power source selected from the one or more power sources that powers the plurality of LEDs through the second switch;
wherein the plurality of LEDs are wired in a parallel circuit.

11. The heat exchange apparatus according to claim 10
wherein the first plurality of locking tabs attaches the second end of the fan cylinder to the third end of the CO2 cylinder;
wherein the second plurality of locking tabs attaches the fourth end of the CO2 cylinder to the fifth end of the vent cylinder;
wherein the first end of the fan cylinder is a closed end;
wherein the sixth end of the vent cylinder is a closed end;
wherein the fan is installed in the fan cylinder such that the fan draws air through the plurality of intake vents and discharges that drawn air into the third end of the vent cylinder.

12. The heat exchange apparatus according to claim 11
wherein the grate ledge is formed on the interior lateral face of the CO2 cylinder;
wherein a plane formed by the grate ledge is perpendicular to a center axis of the CO2 cylinder;
wherein the CO2 grate rests on a superior edge of the grate ledge;
wherein the dry ice rests on a superior surface of the CO2 grate;
wherein the discharge plate of each of the plurality of takeoffs is formed through the lateral face of the vent cylinder such that an acute angle is formed between the lateral face of the vent cylinder and the redirected airflow of the louver in the direction of the fifth end;
wherein the discharge plate of each of the plurality of takeoffs is formed through the vent cylinder such that the louver extends into an interior space formed by the vent cylinder;
wherein the vent cylinder contains the second switch, the first limit resistor, the second limit resistor, the transistor, the plurality of LEDs, and the second power source;
wherein the fan cylinder contains the first switch and the first power source.

13. The heat exchange apparatus according to claim 12
wherein the first negative terminal of the first power source electrically connects to the second negative terminal of the first power source;
wherein the cathode of each of the plurality of LEDs electrically connects to the second negative terminal of the first power source;
wherein the fan electrically connects to the second negative terminal of the first power source;
wherein the first positive terminal of the first power source electrically connects to the first lead of the first switch;
wherein the second lead of the first switch electrically connects to the fan;
wherein the second lead of the first switch electrically connects to the fifth lead of the first limit resistor;

wherein the sixth lead of the first limit resistor electrically connects to the base of the transistor;

wherein the second positive terminal of the second power source electrically connects to the third lead of the second switch;

wherein the second positive terminal of the second power source electrically connects to the collector of the transistor;

wherein the emitter of the transistor electrically connects to the seventh lead of the second limit resistor;

wherein the fourth lead of the second switch electrically connects to the seventh lead of the second limit resistor;

wherein the eighth lead of the second limit resistor electrically connects to the anode of each of the plurality of LEDs.

\* \* \* \* \*